United States Patent
Levy et al.

(10) Patent No.: US 9,869,756 B2
(45) Date of Patent: Jan. 16, 2018

(54) LOW POWER LASER SENSING

(71) Applicant: ISRAEL AEROSPACE INDUSTRIES LTD., Lod (IL)

(72) Inventors: Benjamin Levy, Gedera (IL); Valery Heymann, Yehud (IL); Igal Greenberg, Hod Hasharon (IL); Uri Karazi, Nof Ayalon (IL); Amnon Ychye, Gedera (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 209 days.

(21) Appl. No.: 14/898,446

(22) PCT Filed: Jun. 19, 2014

(86) PCT No.: PCT/IL2014/050556
§ 371 (c)(1),
(2) Date: Dec. 14, 2015

(87) PCT Pub. No.: WO2014/203257
PCT Pub. Date: Dec. 24, 2014

(65) Prior Publication Data
US 2016/0139249 A1  May 19, 2016

(30) Foreign Application Priority Data
Jun. 19, 2013  (IL) .......................................... 227050

(51) Int. Cl.
*G01C 21/02* (2006.01)
*G01S 7/491* (2006.01)
*F41G 3/14* (2006.01)
*F41G 7/22* (2006.01)
(Continued)

(52) U.S. Cl.
CPC ............ *G01S 7/4913* (2013.01); *F41G 3/145* (2013.01); *F41G 7/226* (2013.01); *F41G 7/2293* (2013.01); *G01S 3/784* (2013.01); *G01S 7/493* (2013.01)

(58) Field of Classification Search
CPC ........ F41G 7/226; F41G 7/2293; F41G 3/145; F41G 3/02; G01S 13/34; G01S 2007/356
See application file for complete search history.

(56) References Cited

U.S. PATENT DOCUMENTS 5,332,176 A  7/1994 Wootton et al.
7,521,664 B2  4/2009 David
(Continued)

FOREIGN PATENT DOCUMENTS

EP  0770884  5/1997
FR  2422178  11/1997
WO  2011/073980  6/2011

*Primary Examiner* — Thanh Luu
(74) *Attorney, Agent, or Firm* — Dorsey & Whitney LLP (57) ABSTRACT

The presently disclosed subject matter includes a laser system and a respective method of detecting a signal reflected from a target illuminated by a modulated CW light source configured to generate a modulated laser signal at a predefined modulation frequency. A signal comprising true laser signal portions reflected from said target, and noise is received; the signal is filtered for selecting laser signal portions at a modulation frequency band; and the true signal portions in the signal are detected, if the energy at the modulation frequency band is greater than a given threshold.

21 Claims, 5 Drawing Sheets

(51) Int. Cl.
    *G01S 3/784*    (2006.01)
    *G01S 7/493*    (2006.01)

(56) References Cited

U.S. PATENT DOCUMENTS

2013/0087684 A1    4/2013  Guetta et al.
2015/0331098 A1*   11/2015 Luebbert ................. G01S 7/354
                                                           342/91

* cited by examiner

410 For each processing channel:

Receiving laser signal reflected from a target along with ambient noise 401

Sampling signal at a given frequency 403

Dividing the received signal to different frequency bands and integrating the energy of the received signal at modulation frequency band during a predefined time window 405

Selecting integrated energy at the modulation frequency of the laser signal 407

Comparing between integrated energies in the different processing channels 409

Determining direction to the illuminated spot based on distribution of the integrated energy over the 4 quarters 411

Guiding platform towards illuminated spot 413

Fig. 4

LOW POWER LASER SENSING

TECHNICAL FIELD

The presently disclosed subject matter relates to the field of laser designation.

BACKGROUND

Designating targets using laser spots is a widely known technique due to high precision of the pointing laser device and the relatively low cost of the homing head (or seeker). For example a seeker can be mounted on an intercepting platform, such as a missile, and utilize the energy reflected from an illuminated target, for generating steering commands and homing the intercepting platform towards a target.

Figure 1:
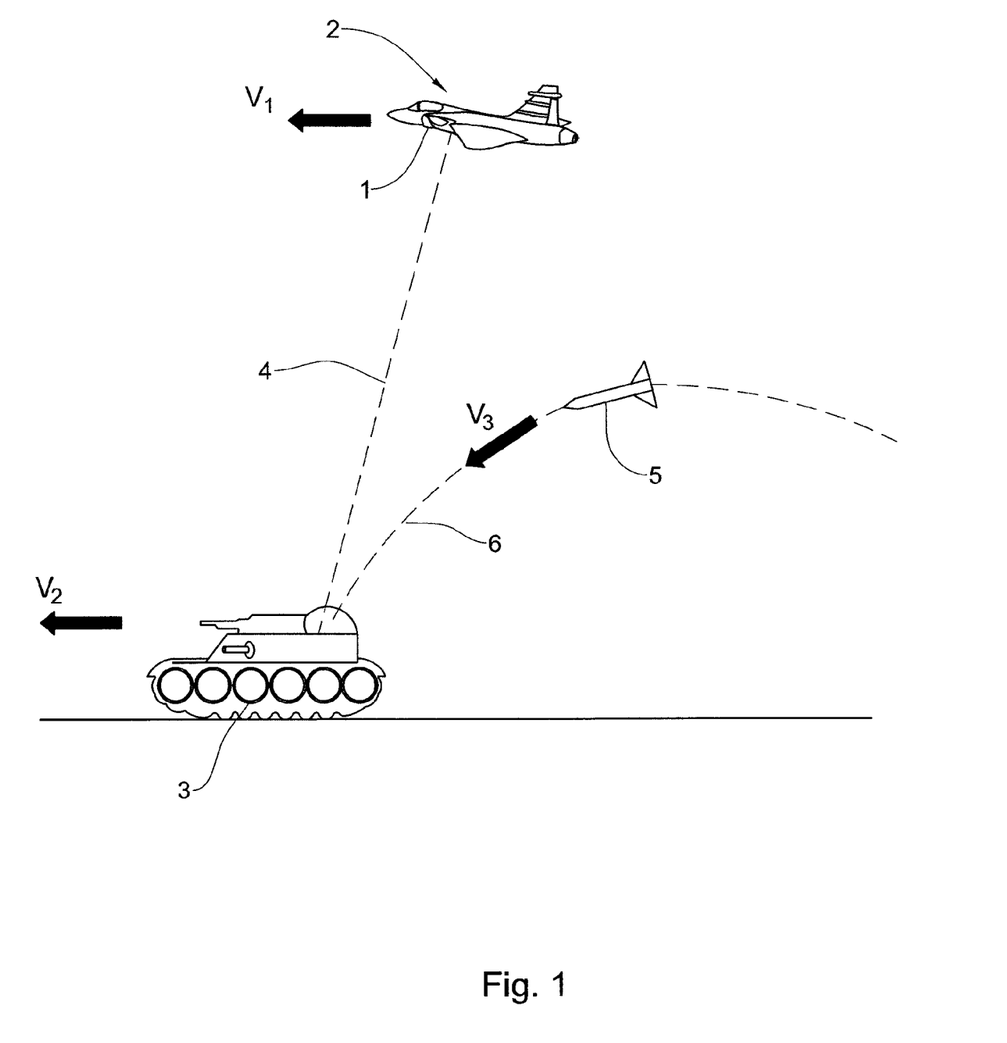
FIG. 1 is a schematic illustration showing a possible scenario where laser pointing technique is utilized.

As illustrated schematically in FIG. 1, according to known laser spot guiding techniques, a laser designator 1 constantly tracks the target 3 and illuminates it with a pulsed spot laser beam 4. FIG. 1 also illustrates an intercepting platform 5 (in this case a missile) employing a seeker with a laser sensor. The sensor's surface is often divided into four equal sectors (not shown in FIG. 1) and associated with a spectral filter which transfers energy reflected from the illuminated target as well as a certain portion of noise (that can stem e.g. from sunlight). The energy received in each of the sectors of the sensor is converted into corresponding signal intensity. The differences between the signal intensities in the respective sectors are used to calculate the direction to the target (line of sight—LOS 6) and/or the change of direction LOS rate. The calculated LOS and/or LOS rate serve for steering the missile for homing onto the target 3.

Publications considered to be relevant as background to the presently disclosed subject matter are listed below. Acknowledgement of the references herein is not to be inferred as meaning that these are in any way relevant to the patentability of the presently disclosed subject matter.

US Patent Application, Publication No. US2013087684 discloses a laser designator system using modulated CW laser diodes and a conventional high pixel count image sensor array, such as CCD or CMOS array. These systems filter the laser signal spatially, by collecting light over a comparatively long period of time from a very few pixels out of the entire field of view of the image sensor array. This is in contrast to the prior art systems where the laser signal is filtered temporarily, over a very short time span, but over a large fraction of the field of view. By spatially filtering the signal outputs of the individual pixels, it becomes possible to subtract the background illumination from the illuminated laser spot.

EP Patent Application, Publication No. 0770884 discloses a process which includes sensitivity to spatial solar noise which masks the detection of a target. After formation of an image of the scene containing an image of the target which is illuminated by a laser beam forming an illuminated spot, and focusing of this image, the illuminated spot is detected. Detection is carried out by continual transfer of charges in a CCD matrix, the charges being freed by photon conversion from the incident light flux with a limited exposure time. The system includes an objective focusing on to a matrix detector with pixels (Pi), integrated with a multiplexing circuit (C) coupled to an output shift register (R). This is linked to an amplification stage (A) and a processing unit (5) comprising a sequencer for applying charge transfer signals to the detector and to the output register.

GENERAL DESCRIPTION

According to an aspect of the presently disclosed subject matter there is provided a method of detecting a signal reflected from a target illuminated by a modulated CW light source configured to generate a modulated laser signal at a predefined modulation frequency, the method comprising:
receiving a signal comprising true laser signal portions reflected from said target, and noise; filtering the signal for selecting laser signal portions at a modulation frequency band; and detecting the true signal portions in the signal, if the energy at the modulation frequency band is greater than a given threshold.

According to some examples of the presently disclosed subject matter the method further comprising: sampling the received signal at a sampling rate greater than the modulation frequency, thereby generating a plurality of samples; performing the filtering with the help of a digital filter; the filtering comprising: dividing the samples into different frequency bands and integrating energy of samples at the modulation frequency band during a given time window; and detecting the true signal portions in the signal, if the integrated energy of the samples at the modulation frequency band is greater than a given threshold.

According to some examples of the presently disclosed subject matter the signal is received by a 4 quarters laser sensor, each quarter is associated with a respective processing channel, wherein said filtering is performed in each of the processing channels for signals received at the respective quarter, the method further comprising: determining a direction to a spot illuminated by the laser signal based on the distribution of the energy at the modulation frequency band across the 4 quarters of the sensor.

According to some examples of the presently disclosed subject matter the method further comprising: upon receiving a laser signal with a given intensity, detecting true signal portions based on signal intensity if the given intensity of the signal is greater than a predefined threshold; otherwise detecting the true signal portions based on the energy at the modulation frequency band.

According to some examples of the presently disclosed subject matter the method further comprising: summing energy of signals received in at least each pair of adjacent quarters, thereby generating 4 intermediate processing channels; and performing said filtering on each of the intermediate processing channels.

According to some examples of the presently disclosed subject matter the method further comprising: summing energy of signals received in all quarters, thereby generating a fifth intermediate processing channel; and performing said filtering on the fifth processing channel.

According to another aspect of the presently disclosed subject matter there is provided a laser sensor unit operable for detecting a signal reflected from a target illuminated by a modulated CW light source configured to generate a laser signal modulated at a predefined modulation frequency, the sensor comprising:
a sensor head associated with at least one processing channel; said processing channel comprising a sampler and an energy integration module; the sensor head is operable to receive a signal comprising true signal portions reflected from said target, and noise; the sampler is configured to sample the received signal at a frequency which is at least greater than the modulation frequency; the energy integration module is configured to integrate energy received at different frequency bands of the sampled signal during a given time window; and the laser sensor is further configured to detect the true signal portions in the signal, if the integrated energy at the modulation frequency band is greater than a given threshold.

According to some examples of the presently disclosed subject matter the laser sensor is a 4 quarters laser sensor, each quarter being connected to a respective processing channel, wherein said integration is performed in each of the processing channels for signals received at the respective quarter, the laser sensor further comprising a target detection unit configured to determine a direction to a spot illuminated by the laser signal based on the distribution of the integrated energy at the modulation frequency band across the 4 quarters of the sensor.

According to some examples of the presently disclosed subject matter, the energy integrating module comprises a Fast Fourier Transform filter configured to divide the received signal into different frequency bands and integrate the energy at different frequency bands.

According to some examples of the presently disclosed subject matter, each processing channel comprises a respective frequency F cell selection module configured for selecting the integrated energy at the frequency band of the modulation frequency received at the respective quarter.

According to some examples of the presently disclosed subject matter each processing channel comprises a respective energy threshold detector configured to determine whether the integrated energy at the modulation frequency band is greater than a predefined threshold.

According to some examples of the presently disclosed subject matter the sensor is a dual purpose laser sensor configured to detect both high power laser signal and low power laser signal generated by the modulated CW light source; wherein each processing channel further includes a respective high power processing pathway for processing high power laser signals; said laser sensor is configured, upon receiving a signal with intensity greater than a given threshold, to process the signal via the high power processing pathway and detect the true signal portions based on signal intensity.

According to some examples of the presently disclosed subject matter the laser sensor is integrated in a laser system, further comprising the modulated CW light source.

According to some examples of the presently disclosed subject matter there is provided a program storage device readable by machine, tangibly embodying a program of instructions executable by the machine to perform method steps of detecting a signal reflected from a target illuminated by a CW light source configured to generate a modulated laser signal modulated at a predefined modulation frequency, the method comprising: receiving information indicative of a plurality of samples of a signal, the signal comprising true signal portions reflected from said target, and noise; dividing the samples into different frequency bands and integrating energy of samples at the modulation frequency band during a given time window; and detecting the true signal portions in the signal, if the integrated energy of the samples at the modulation frequency band is greater than a given threshold.

According to some examples of the presently disclosed subject matter the method steps in the program storage device further comprise sampling the received signal at a sampling rate greater than the modulation frequency, thereby generating a plurality of samples; performing the filtering with the help of a digital filter; the filtering comprising: dividing the samples into different frequency bands and integrating energy of samples at the modulation frequency band during a given time window; and detecting the true signal portions in the signal, if the integrated energy of the samples at the modulation frequency band is greater than a given threshold.

BRIEF DESCRIPTION OF THE DRAWINGS

In order to understand the invention and to see how it may be carried out in practice, embodiments will now be described, by way of non-limiting example only, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate analogous elements.

DETAILED DESCRIPTION

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
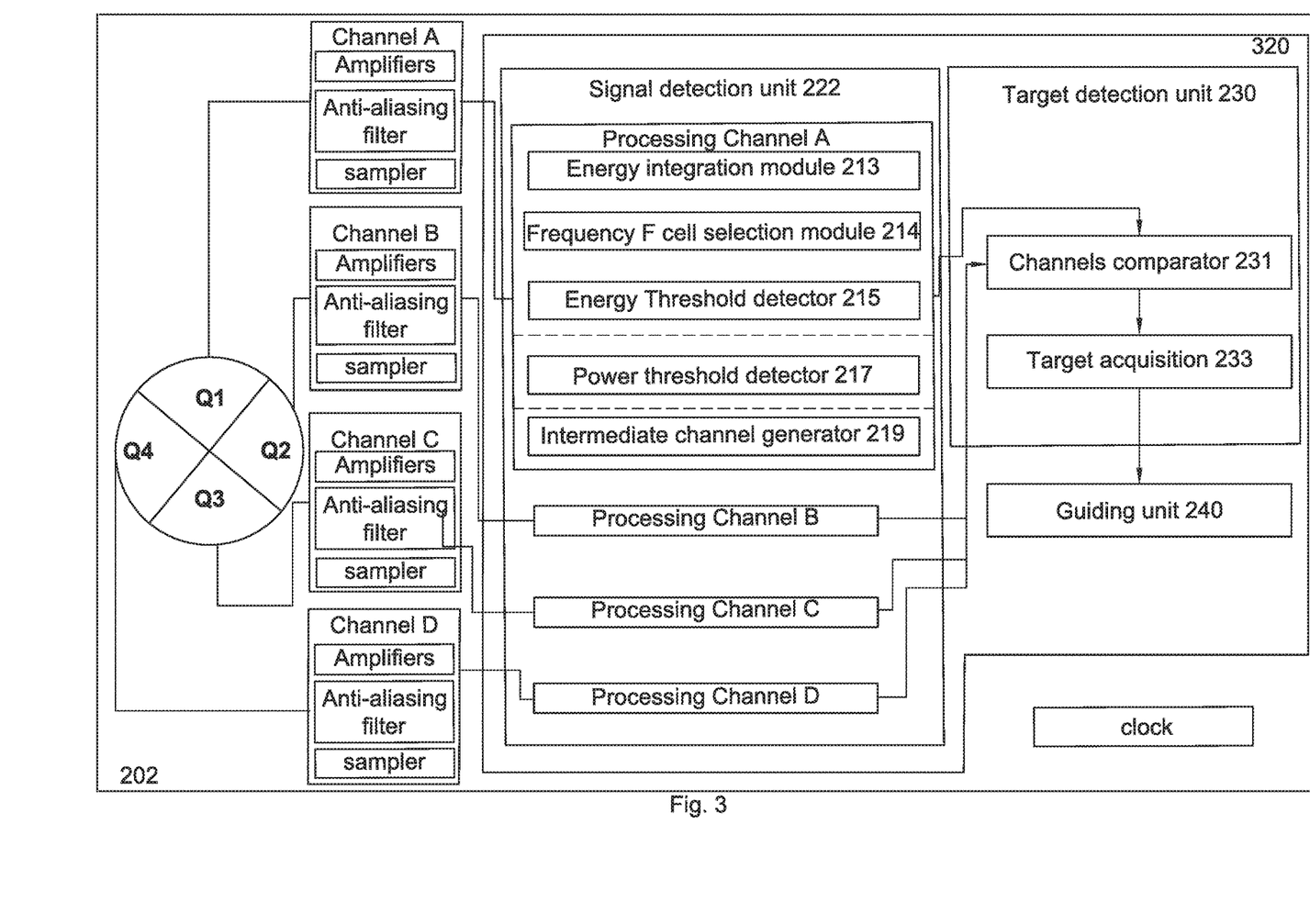
FIG. 3 is a function block diagram showing a more detailed example of a dual purpose quadrant laser sensor, in accordance with the presently disclosed subject matter.
Figure 4:
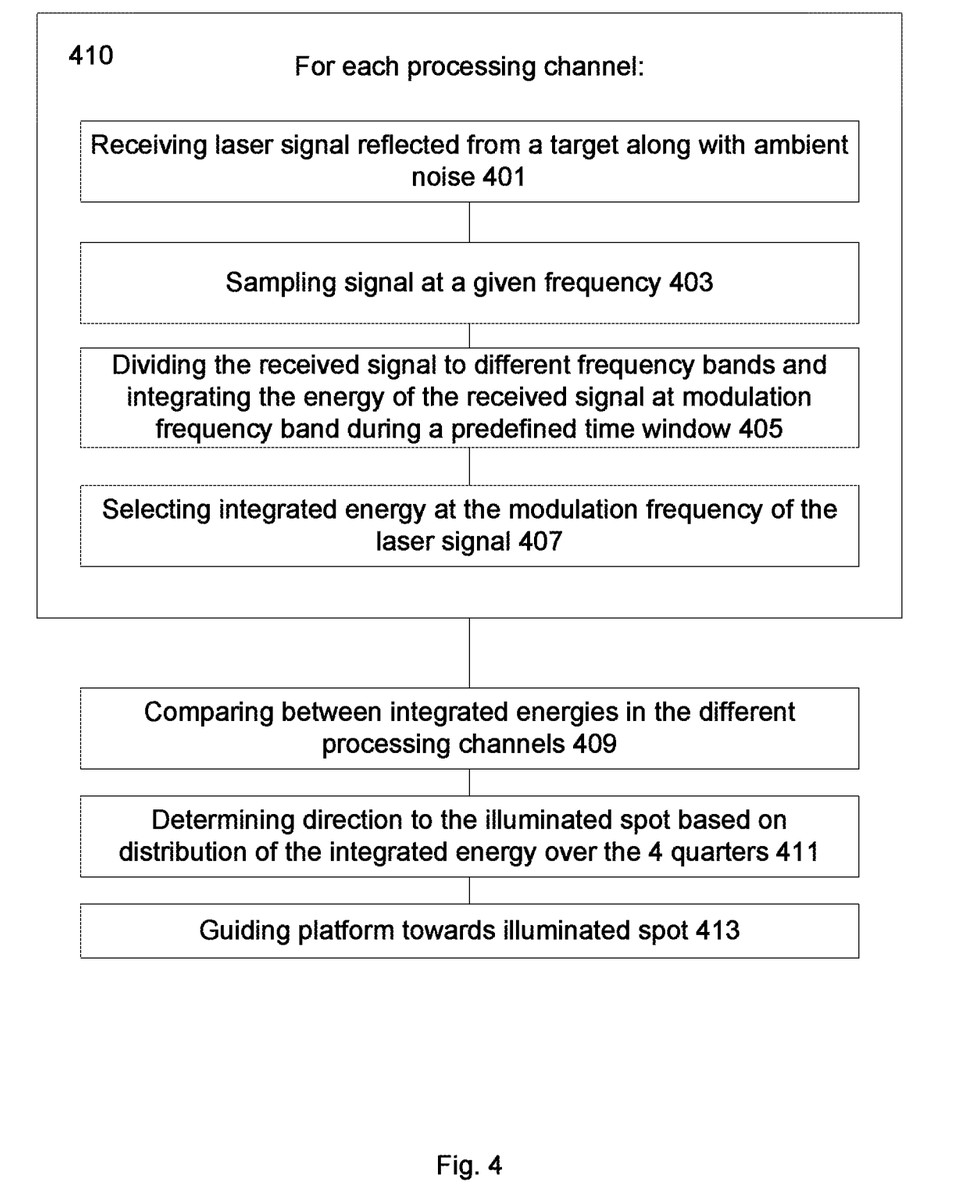
FIG. 4 is a flowchart showing an example of operations performed in accordance with the presently disclosed subject matter.

In embodiments of the presently disclosed subject matter, fewer, more and/or different stages than those shown in FIG. 4 may be executed. In embodiments of the presently disclosed subject matter one or more stages illustrated in FIG. 4 may be executed in a different order and/or one or more groups of stages may be executed simultaneously. FIGS. 1, 2 and 3 illustrate schematics of the system architecture in accordance with an embodiment of the presently disclosed subject matter. In different examples of the presently disclosed subject matter, the system may comprise fewer, more, and/or different elements than those shown in FIGS. 1, 2 and 3. The invention is not bound by the specific architecture depicted in FIGS. 1, 2 and 3; equivalent and/or modified functionality may be consolidated or divided in another manner and may be implemented in any appropriate combination of software, firmware and hardware.

Bearing the above in mind, the description now returns to FIG. 1. In accordance with one possible (yet not exclusive) scenario, laser designator 1 transmits pulses at a rate of 10-20 Hz, facilitating sampling of energy reflected from a designated target for homing purposes. The pulse width is typically narrow (in the order of 10-50 nanoseconds) and has generally energy in the order of 10 to 130 millijoules. Energy between 10 to 130 millijoules in a narrow pulse provides a laser signal with high peak power pulses. For example a laser pulse generated by a laser designator operating at a rate of 10 Hz and energy of 100 millijoules is characterized by an average power of a few watts and a laser pulse with peak power in the order of 10 Megawatts or higher. The use of laser signals with high power pulses (referred herein as "high power laser signal" and generated for example by Nd:YAG laser designator) possibly together with appropriate spectral filtering and also possibly with synchronized gating between the laser designator and the laser sensor, enables a power-sensitive laser sensor to discriminate the laser pulse from the background noise (ambient noise such as sunlight) at a sufficient level of certainty. In general, a high power laser signal is characterized by power which enables a power-sensitive laser sensor to discriminate the laser signal from the background based on the peak power of the signal.

According to the example shown in FIG. 1 of an intercepting platform being directed towards a target, the energy received by the sensor is converted to electrical current/voltage, depending also on the sensor's sensitivity. The output power of the laser allows to process, at the intercepting platform, the so discerned signal at a sufficient range from the target, providing a signal to noise ratio that is sufficient for example, for generating steering commands for the intercepting missile in order to achieve an accurate homing onto target 3.

Techniques directed for processing the reflected energy of a laser beam, which rely on high power laser signals, suffer from a number of disadvantages. For example, laser designators generating a beam with the required high power are characterized by a complex and fragile structure of relatively large physical dimensions, as well as relatively high weight. These characteristics of the designator hinder the possibility to carry portable laser designators by a person such as an infantry individual, or fitting them in a vehicle (for instance an Unmanned Ground/Aerial Vehicle). In addition, such laser designators are characterized by a relatively high price tag.

A possible alternative is to use low-energy laser designators which are characterized by lower-weight and smaller dimensions, as well as lower costs. Among laser designators which are available today there are laser designators operating with modulated CW (continuous wave) laser diodes. These CW laser diodes are in fact CW laser sources which are toggled on and off, providing an output stream of laser pulses which are temporally separated from each other by the modulation period, such that the stream comprises pulses of laser illumination temporally separated by spaces without laser illumination. A good result can be achieved where the pulses of laser illumination and the separating spaces are of equal size. CW laser diodes are indeed cheaper and of smaller dimensions than laser designators of high power laser.

When compared to pulses of high power laser signals described above, pulses of a laser signal which is generated by the modulated CW diodes are characterized by lower-power and higher energy (in some cases the power of a pulse generated by a CW laser is lower by a factor of around $10^6$ than the power of pulses of a high power signal described above).

Due to the low power of the CW laser pulse, and further due to the fact that in some laser guiding scenarios such as the one described with reference to FIG. 1, at the initial intercepting phase the intercepting platform is relatively far away from the designated target, the energy which is reflected from the designated target and received by the sensor is inherently of low intensity. As the signal to noise ratio is naturally low, the reflected energy may be insufficient for enabling known in the art seekers to properly discern between signal and noise in order to calculate the angular error and angular error rate, and thus cannot be used for accurately homing a platform to its designated target.

One solution which is proposed in the prior art (for example in US Patent Application, Publication No. US2013087684) is using a multi-pixel matrix, such as a CCD or CMOS sensor. This solution is based on the paradigm that as the laser energy is collected by individual pixels, each of a smaller area than the area of a sector of a quadrant sensor, the signal to noise ratio per pixel remains sufficiently low for detection.

While this technique may work in some cases, it lacks many of the advantages of a quadrant sensor over a multi-pixel matrix sensor. For example, the sensitivity of a CCD or CMOS sensor to laser signals at a typical wave length of 1064 Nanometer is lower than that of a quadrant sensor. In addition, multi-pixel matrix sensors which can operate at sampling frequencies which are greater than a few tenths of cycles per second are non-standard and expensive devices. Quadrant laser sensors, on the other hand, which can operate at very high frequencies, are common and cheaper devices. Today industrial and military systems prevalently utilize quadrant laser sensors. As mentioned above, these sensors are very efficient when operating with high power laser signals. Therefore, it would be advantages to adapt quadrant laser sensors, which are already in use, to operate with low power laser signals, rather than replacing them with multi-pixel matrixes.

Furthermore, when using multi-pixel matrix sensors and detection methods which include comparing between images generated by the sensor at different time periods (as disclosed in US2013087684) a higher F # (i.e. the ratio of the lens's focal length to the diameter of the entrance pupil) than that of a PIN (Positive Intrinsic Negative) sensor is required in order to generate images of sufficient quality. Because of the requirement for a higher F # as well as the diameter of the sensor which characterize multi-pixel matrix sensors (which is practically smaller compared to the diameter of a PIN sensor) a larger field of view and greater sensitivity can be obtained with a PIN sensor than that which can be obtained with a multi-pixel matrix sensor.

Accordingly, the presently disclosed subject matter includes a laser sensor and respective method which enables to utilize a single photodiode sensor for discerning between reflections of a laser signal generated by a low power CW laser designator and background noise. The subject matter disclosed herein further includes a quadrant laser sensor and respective method which enables to detect a laser signal generated by a low power CW laser designator and further guide a platform towards the designated point based on the detected signals. Furthermore, the subject matter disclosed herein further includes a dual purpose quadrant laser sensor and respective method, which enables to detect both low power laser signals generated by CW designator and high power laser signals generated by a high power laser designator.

Figure 2A:
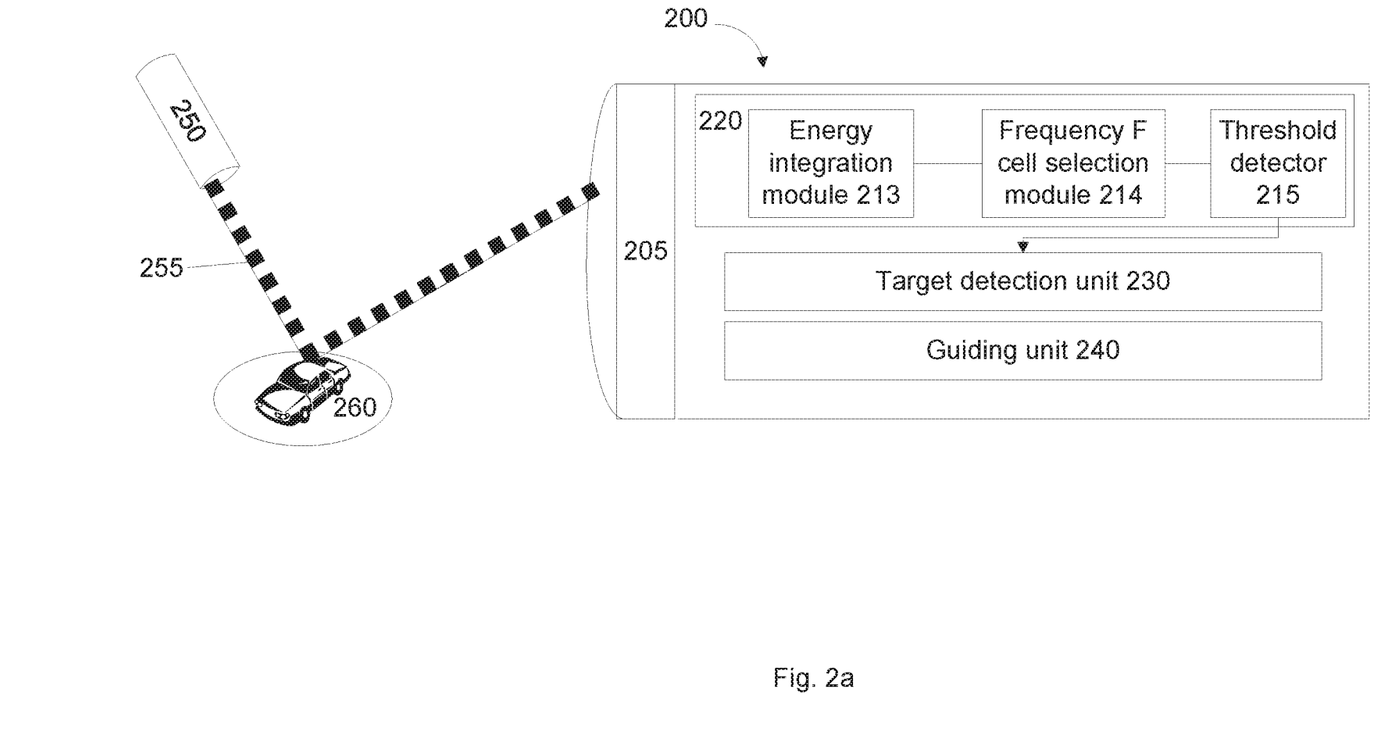
FIG. 2a is a functional block diagram schematically illustrating a laser sensor, in accordance with the presently disclosed subject matter.

Turning to FIG. 2*a*, which shows a functional block diagram schematically illustrating a laser sensor, in accordance with the presently disclosed subject matter. Laser sensor 200 is operable to receive and process reflected energy of a low power laser beam, generated by laser designator 250, and discriminate between the reflected laser signals and the background noise. The detected laser signals enable to track and home a platform (e.g. an intercepting missile) towards the illuminated spot. As mentioned above, laser designator 250 can be for example CW laser diodes transmitting a modulated low power signal 255 towards a target (exemplified in FIG. 2*a* as car 260).

The laser beam is modulated at a predefined frequency. As explained above, a low power laser signal is much more sensitive to background noise than a high power laser signal. For example, the peak power of a CW laser designator is in the order of a few watts while the peak power of a high power laser signal is in the order of megawatts. Thus, the low power laser beam is modulated at a frequency which is sufficiently high for distinguishing between laser signal reflections and other background illuminations which are typically at frequencies as high as 1 KHz. In order to distinguish the laser signal from changes in background illumination the signal can be modulated at a frequency between 2 KHz to a few KHz (e.g. in some typical scenarios between 3 to 6 KHz). However this is not always necessary and other frequencies may be utilized as well. Optionally, additional high rate modulation frequencies can be used as well e.g. for estimating target parameters such as distance to target.

The signal is reflected from the target and received by sensor head 205 at laser sensor 200. Sensor head 205 can comprise a single photodiode allowing detection of the reflected laser. Sensor head 205 can alternatively comprise a quadrant photodiode which enables both detection of the reflected laser signal as well as tracking of the illuminated laser spot. It should be noted that according to the presently disclosed subject matter, instead of a quadrant sensor, sensors divided into other numbers of sectors are also within the scope of the invention. For example, the sensor can be divided into five or six sectors instead of 4.

According to the example illustrated in FIG. 2*a*, laser sensor 200 comprises a signal detection unit 220 which is operable to detect reflections of low power laser beam. To this end laser detection unit 220 comprises an energy integration module 213 and threshold detector 215. The modulated laser signal is detected with the help of the energy integration module 213 comprising some type of band pass filter, which enables to discriminate between different frequency bands (and allow entry of the low frequency bands or the high frequency band or any combination thereof) and thus to detect the frequency band of the modulation frequency of the laser signal.

The energy integration unit can be implemented by an analog filter, by a digital filter or any combination thereof. According to one example, energy integration module 213 can comprise one or more analog filters, each filter configured to detect laser signals at a certain frequency band. Using a filter with a sufficiently wide bandwidth (1/bandwidth=filter integration time) would allow integrating enough energy for discerning signal from noise and detecting the laser signal reflection.

According to another example, energy integration module 213 can comprise a digital filter configured to integrate the energy at the modulation frequency of the laser signal during a predefined time window. For example, the filter can be a Fast Fourier Transform filter. Alternatively, other types of filters can be used such as a FIR (finite impulse response) filter or DFT (discrete Fourier Transform).

Considering the relatively low energy conversion efficiency of the low power laser signal, the size of the integration time window is determined to be long enough for collecting sufficient energy to enable distinguishing laser signal energy from background illumination. At the same time, in case a platform (e.g. a missile) is being guided towards the target based on the laser signal spot indication, the period of time is determined to be short enough to enable generating sufficient steering commands for accurately guiding the platform towards the target.

In case of digital filtering, detection unit 220 can further comprise frequency F cell selection module 214 configured to select the signal portions of the desired frequencies. The energy integrated for the selected portions can be compared (e.g. with the help of threshold detector 215) to a threshold in order to determine whether a laser signal is detected or not.

As explained below, sensor 200 can comprise target detection unit 230 configured to receive the integrated energy from each of the four quarters and determine the direction to the illuminated spot based on the distribution of energy across the different quarters.

Figure 2B:
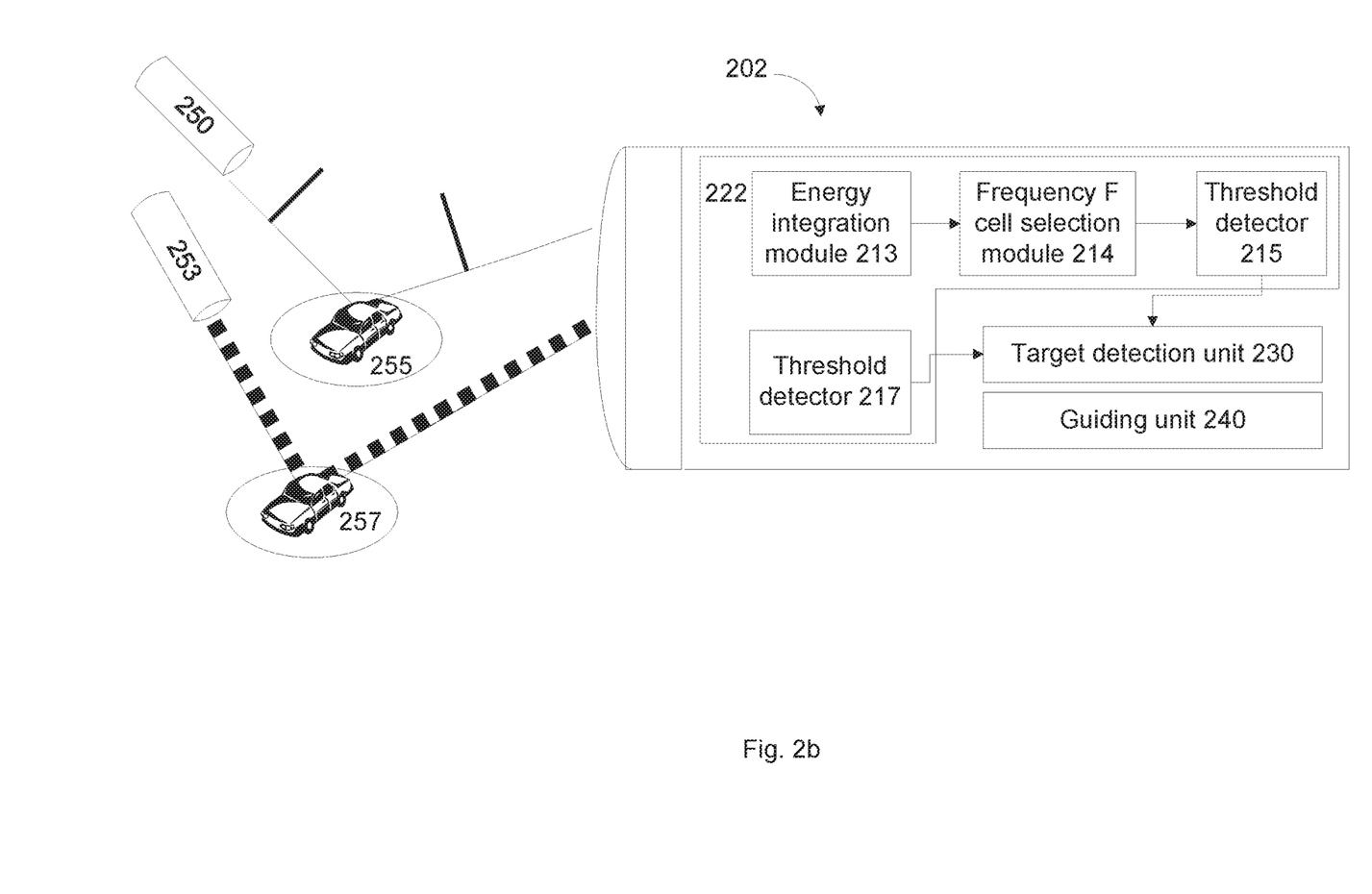
FIG. 2b is a functional block diagram schematically illustrating a dual purpose laser sensor unit, in accordance with the presently disclosed subject matter.

FIG. 2*b* shows a functional block diagram schematically illustrating a dual purpose laser sensor unit, in accordance with the presently disclosed subject matter. Laser sensor 202 is configured as a dual purpose sensor capable of operating with both high power laser signal and low power (e.g. CW modulated) laser signals.

To this end sensor 202 is configured with two processing pathways. The first processing pathway is configured as described above with reference to FIG. 2*a* operable for utilizing reflections of a low power laser signal (e.g. CW modulated). The second processing pathway is a power-sensitive pathway comprising threshold detector 217 which is configured to detect a laser signal based on the intensity of the received signal, as known in the art. The received laser signal is sampled at a frequency which divides the laser signal into samples and a laser pulse is detected if the power of a sample exceeds a predefined threshold. Note, that the samples' size in the power-sensitive pathway is shorter than the integration time implemented for processing low power laser signals in the first processing pathway.

Each of the two processing pathways can be activated based the type of incoming signal. In case a low power CW modulated signal is received, laser sensor 202 is configured to activate the first processing pathway and in case a high power laser signal is received, sensor 202 is configured to activate the second, power-sensitive, processing pathway.

FIG. 3 is a functional block diagram showing a more detailed example of a dual purpose quadrant laser sensor, in accordance with the presently disclosed subject matter. Laser sensor 202, illustrated in FIG. 3, is a four quarters (quadrant) laser sensor comprising a sensor head 205 that is divided into four sectors (quarters), denoted by Q1, Q2, Q3 and Q4. Each sector is associated with a distinct processing channel constituting a part of a processing system. For simplicity, only processing channel A associated with sector Q1 is elaborated in detail. The other sectors Q2 to Q4, are associated with processing channels B to D, which are substantially identical processing channels to channel A. In general all 4 processing channels operate substantially at the same time.

FIG. 4 is a flowchart illustrating an example of sequence of operations carried out in accordance with the presently disclosed subject matter. For better clarity, in the following description, the operations in FIG. 4 are described with reference to the elements illustrated in FIG. 3. However, it should be understood that the specific functional elements which are illustrated in FIG. 3 are merely provided by way of example only and more, less or different elements can be used instead or in addition to these elements. Furthermore, it should be appreciated by those versed in the art that some of the specific technical characteristics of the laser designator and seeker which are described herein represent merely non-limiting examples and variations of these characteristics reside within the scope of the teaching disclosed herein.

Operations described with reference to blocks 401 to 407 in FIG. 4 are performed in at least each of processing units A to D and possibly also in other intermediate processing channels as explained below. At block 401, the laser signal which is reflected from the target is received by sensor head 205 along with ambient noise. The received energy in each channel is transmitted first to a respective one or more amplifiers and an anti-aliasing filter (low-pass filter). Amplifiers can include for example a pre-amplifier and a variable gain amplifier as known in the art. The anti-aliasing filter is configured to eliminate folding when digital filtering and integration is implemented.

At block 403 the incoming signal is sampled (e.g. by a sampler associated with a clock) at a predefined sampling rate. The sampling rate is greater than the (highest) modulation rate. If an anti-aliasing filter is used the sampling rate is also greater than the bandlimit (e.g. the lowpass filter band limit) of the anti-aliasing filter. The digital signal samples are then forwarded to processing unit 320 which is configured, inter alia, to run a target detection process and a target tracking process. Processing unit 320 can include for example field-programmable gate array (FPGA) components, a computer memory, and a clock generator.

As mentioned above, at block 405 the received energy is divided into different frequency bands (or frequencies) and the energy at the different bands (including at least the band of the modulation frequency) is integrated during a predefined time window (e.g. with the help of energy integration module 213). At block 407 the integrated energy at a predefined band which includes the modulation frequency of the laser signal is selected (e.g. with the help of frequency F cell selection module 214) in order to obtain the integrated energy at the modulation frequency. In general, the smaller the selected band (and thus closer to the actual modulation frequency), the smaller the integration time window which is required for integrating sufficient energy for detection.

The integrated energy is compared to a given threshold (e.g. with the help of energy threshold detector 215). In case the integrated energy is greater than the threshold laser signal, detection is established. The threshold can be determined (e.g. with the help of threshold detector 215) as a function of the energy integrated at bands or frequencies which are different than the modulation frequency or respective band. The threshold value can be determined in order to obtain a desired constant false alarm rate (CFAR).

The integration and signal detection are performed for all 4 quarters (in each respective processing channel) and the obtained information is transmitted to channels comparator 231 in target detection unit 230.

In some cases, the laser spot reflected from the target falls between two quarters, such that part of the laser spot is located in one quarter and part of the laser spot is located in an adjacent quarter. In such cases, the energy of the signal in each individual quarter may not accumulate during the integration window to a sufficient amount to enable detection. Accordingly, in such cases it may happen that no signal is detected, although the laser spot falls on the sensor head.

Optionally, in order to facilitate the detection of reflected laser energy, which falls between two adjacent quarters of sensor head 205, 4 additional intermediate channels can be generated in which the samples received in each pair of adjacent quarters are summed. Intermediate channel A-B is generated by summing the respective samples in channel A and channel B; Intermediate channel B-C is generated by summing the respective samples in channel B and channel C; Intermediate channel C-D is generated by summing the energy of respective samples in channel C and channel D; and intermediate channel D-A is generated by summing the respective samples in channel D and channel A. Optionally, another ($9^{th}$ channel) intermediate channel can be generated in which the samples received in all four channels are summed. The summing operation of the values in the different adjacent channels implements non-coherent integration, which, as is well known in the art, results in the attenuation of the noise with respect to the true signal. The intermediate channels can be implemented for both the low power processing pathway and the high power processing pathway. Generation of intermediate channels can be executed for example by intermediate channel generator 219.

At block 409 the integrated energies at the modulation frequency in the 4 processing channels (or possibly also in the intermediate channels as well) are compared. Due to the filtering operation of energy integration module 213 and frequency F selection module 214 only the energy integrated at the modulation frequency (of the laser signal or the respective band) is compared between the different quarters. Since more energy will be integrated at the modulation frequency of the laser signal in the processing channel of the sector which absorbed more laser signal energy, the location of the laser signal across the 4 quarters can be detected based on this comparison. Accordingly, the illuminated laser spot and respective target can be acquired based on the distribution of integrated energy across the different sectors (block 411). Guiding unit 240 can be utilized for generating steering commands based on the distribution of energy across the sectors e.g. 4 quarters of a quadrant sensor (block 413).

As explained above detection unit 222 can further comprise a second processing pathway for processing high power laser signals. To this end detection unit can comprise for example power threshold detector 217 operable to discriminate laser signal from the background noise based on comparison of the intensity of the signal to a predefined power threshold value. This is performed in all processing channels and the laser spot and respective illuminated target are tracked based on the distribution of laser signal power over the 4 quarters.

Sensor 202 can be configured to utilize the relevant processing pathway based on the power of the received signal. In case the power of the received signal is less than a given threshold the first processing pathway is used for detecting the laser reflections based on integrated energy. Otherwise, the second processing pathway is used for detecting the laser reflections based on their intensity.

It will also be understood that the presently disclosed subject matter contemplates a computer program being readable by a computer processor for executing the method of the presently disclosed subject matter. The presently disclosed subject matter further contemplates a machine-readable memory (including transitory and non-transitory) tangibly embodying a program of instructions executable by the machine for executing the method of the presently disclosed subject matter.

The laser sensor disclosed herein with reference to FIGS. 1, 2 and 3 comprises or is otherwise associated with at least one processor operable for executing related operations as described herein. The term "processor" should be expansively construed to cover any kind of electronic device with data processing capabilities, including, by way of non-limiting example, a computing system, a digital signal processor (DSP), a microcontroller, a field programmable gate array (FPGA), an application specific integrated circuit (ASIC), etc.) or any other appropriate electronic computing device, and or any combination thereof.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

While certain features of the invention have been illustrated and described herein, many modifications, substitutions, changes, and equivalents will now occur to those of ordinary skill in the art. It is, therefore, to be understood that the appended claims are intended to cover all such modifications and changes.

The invention claimed is:

1. A method of detecting a signal reflected from a target, the method comprising:
   receiving light signals by sampling continuous wave (CW) input signals at a sampling rate selected to be greater than a frequency corresponding to predefined frequency bands used for signal modulation, and generating a plurality of samples; and
   processing said plurality of samples, said processing including:
      applying filtering to said plurality of samples for dividing said plurality of samples into different frequency bands during a given time window; and
      analyzing the divided samples and determining the energy integrated at frequency bands including the energy integrated at a modulation frequency and the energy integrated at frequencies different from the modulation frequency;
      determining a threshold as a function between the energy integrated at frequencies different from the modulation frequency and the energy integrated at the modulation frequency; and
      applying said threshold to the divided samples, thereby detecting true signal portions reflected from said target corresponding to the modulation frequency band greater than said determined threshold.

2. The method according to claim 1 wherein said filtering applied to the plurality of samples is performed with the help of a digital filter.

3. The method according to claim 2 wherein the digital filter is a Fast Fourier filter.

4. The method according claim 1 wherein the signal is received by a 4 quarters laser sensor, each quarter is associated with a respective processing channel, wherein said filtering is performed in each of the processing channels for signals received at the respective quarter, the method further comprising:
   determining a direction to a spot illuminated by the laser signal based on the distribution of the energy at the modulation frequency band across the 4 quarters of the sensor.

5. The method according claim 1, wherein said filtering applied to the plurality of samples is performed with an anti-aliasing filter; the sampling rate being greater than a band-limit of the anti-aliasing filter.

6. The method according to claim 1, further comprising:
   upon receiving a laser signal with a given intensity,
   detecting true signal portions based on signal intensity if the given intensity of the signal is greater than a predefined threshold; otherwise
   detecting the true signal portions based the energy at the modulation frequency band.

7. The method according to claim 1, further comprising:
   summing energy of signals received in at least each pair of adjacent quarters, thereby generating 4 intermediate processing channels; and
   performing said filtering on in each of the intermediate processing channels.

8. The method according to claim 1, further comprising:
   summing energy of signals received in all quarters, thereby generating a fifth intermediate processing channel; and
   performing said filtering on the fifth processing channel.

9. A laser sensor unit operable for detecting a signal reflected from a target illuminated by a modulated CW light source configured to generate a laser signal modulated at a predefined modulation frequency, the laser sensor unit comprising:
   a sensor head associated with at least one processing channel, the sensor head being operable to receive light input comprising true signal portions reflected from said target, and noise; said at least one processing channel including:
      a sampler configured to sample the light input being received with a sampling rate which is greater than a frequency corresponding to predefined frequency bands used for signal modulation, and thereby generating a plurality of samples;
      an energy integration module configured to process the plurality of samples and divide the samples into different frequency bands and integrate energy of the divided samples at said different frequency bands during a given time window, said energy integrated at different frequency bands including energy integrated at the modulation frequency and energy integrated at frequencies different from the modulation frequency; and
      an energy threshold detector configured for processing said energy integrated at said different frequency bands for determining a threshold as a function between the energy integrated at frequencies different from the modulation frequency and the energy integrated at the modulation frequency, and applying the determined threshold to thereby detect the true signal portions in the signal, corresponding to the modulation frequency band greater than said threshold.

10. The laser sensor unit according to claim 9 is a 4 quarters laser sensor, each quarter being connected to a respective processing channel, wherein said integration is performed in each of the processing channels for signals received at the respective quarter, the laser sensor further comprising a target detection unit configured to determine a direction to a spot illuminated by the laser signal based on the distribution of the integrated energy at the modulation frequency band across the 4 quarters of the sensor.

11. The laser sensor unit according to claim 10 wherein each processing channel comprises an anti-aliasing filter configured to filter the received signal at the respective quarter in order to avoid folding; wherein the sampling rate is greater than the band-limit of the anti-aliasing filter.

12. The laser sensor unit according to claim 9 wherein the energy integrating module includes a digital filter configured to divide the received signal into different frequency bands and to enable to integrate the energy at different frequency bands.

13. The laser sensor unit according to according to claim 9 wherein each processing channel includes a respective frequency F cell selection module configured for selecting the integrated energy at the frequency band of the modulation frequency received at the respective quarter.

14. The laser sensor unit according to according to claim 9 wherein each processing channel includes a respective energy threshold detector configured to determine whether the integrated energy at the modulation frequency band is greater than a predefined threshold.

15. The laser sensor unit according to according to claim 9 is a dual purpose laser sensor configured to detect both high power laser signal and low power laser signal generated by the modulated CW light source; wherein each processing channel further includes a respective high power processing pathway for processing high power laser signals;
said laser sensor is configured, upon receiving a signal with intensity greater than a given threshold, to process the signal via the high power processing pathway and detect the true signal portions based on signal intensity.

16. The laser sensor unit according to according to claim 9 is further configured to sum energy of signals received in at least each pair of adjacent quarters, thereby generating 4 intermediate processing channels; and integrate energy in each of the intermediate processing channels.

17. The laser sensor unit according to according to claim 9 is further configured to sum energy of signals received in all quarters, thereby generating a fifth intermediate processing channel; and integrate energy in the fifth processing channel.

18. The laser sensor unit according to claim 9 being integrated in a laser system, the laser system further comprising the modulated CW light source.

19. The laser sensor unit according to claim 9 being integrated in a laser system, the laser system further comprising a high power laser designator.

20. A non-transitory program storage device readable by machine, tangibly embodying a program of instructions executable by the machine to perform method steps of detecting a signal reflected from a target, the method comprising:
receiving light signals by sampling continuous wave (CW) input signals at a sampling rate selected to be greater than a frequency corresponding to predefined frequency bands used for signal modulation, and generating a plurality of samples;
processing said plurality of samples, said processing comprising:
applying filtering to said plurality of samples for dividing said plurality of samples into different frequency bands during a given time window; and
analyzing the divided samples and determining the energy integrated at frequency band including the energy integrated at a modulation frequency and the energy integrated at frequencies different from the modulation frequency;
determining a threshold as a function between the energy integrated at frequencies different from the modulation frequency and the energy integrated at the modulation frequency; and
applying said threshold to the divided samples thereby detecting true signal portions reflected from said target corresponding to the modulation frequency band greater than said determined threshold.

21. The program storage device of claim 20 wherein said filtering applied to the plurality of samples is performed with the help of a digital filter.

* * * * *